United States Patent

United States Patent
Davis

[15] 3,651,712
[45] Mar. 28, 1972

[54] MOBILE DRIVE MECHANISM

[72] Inventor: John L. Davis, 3228 Pillsbury Avenue South, Minneapolis, Minn. 55408

[22] Filed: Sept. 11, 1970

[21] Appl. No.: 71,507

[52] U.S. Cl. ............................... 74/687, 74/720.5, 74/710
[51] Int. Cl. .................... F16h 47/04, F16h 37/06, F16h 1/38
[58] Field of Search ............................................ 74/687, 720.5

[56] References Cited

UNITED STATES PATENTS

| | | | |
|---|---|---|---|
| 1,197,789 | 9/1916 | Bluemel | 74/687 |
| 1,951,345 | 3/1934 | Centervall | 74/687 |
| 2,171,146 | 8/1939 | Montelius | 74/687 |
| 3,461,744 | 8/1969 | Booth | 74/720.5 |

*Primary Examiner*—Arthur I. McKeon
*Attorney*—Schroeder, Siegfried and Ryan

[57] ABSTRACT

A differential gearing mechanism providing an improved mobile drive and steering mechanism for vehicles which are steered by a difference in rotation imparted to drive shafts on each side of a vehicle. The differential gearing mechanism utilizes a standard differential gearing with a drive motor connected to the gear case. A control motor associated with the gear case or one of the output shafts and rotatable therewith drives through control gears to the idler gears of the differential gearing mechanism to impart rotation to the driven gears of the differential with reversible rotation at variable speeds to vary the rotation of the output shafts connected thereto.

19 Claims, 5 Drawing Figures

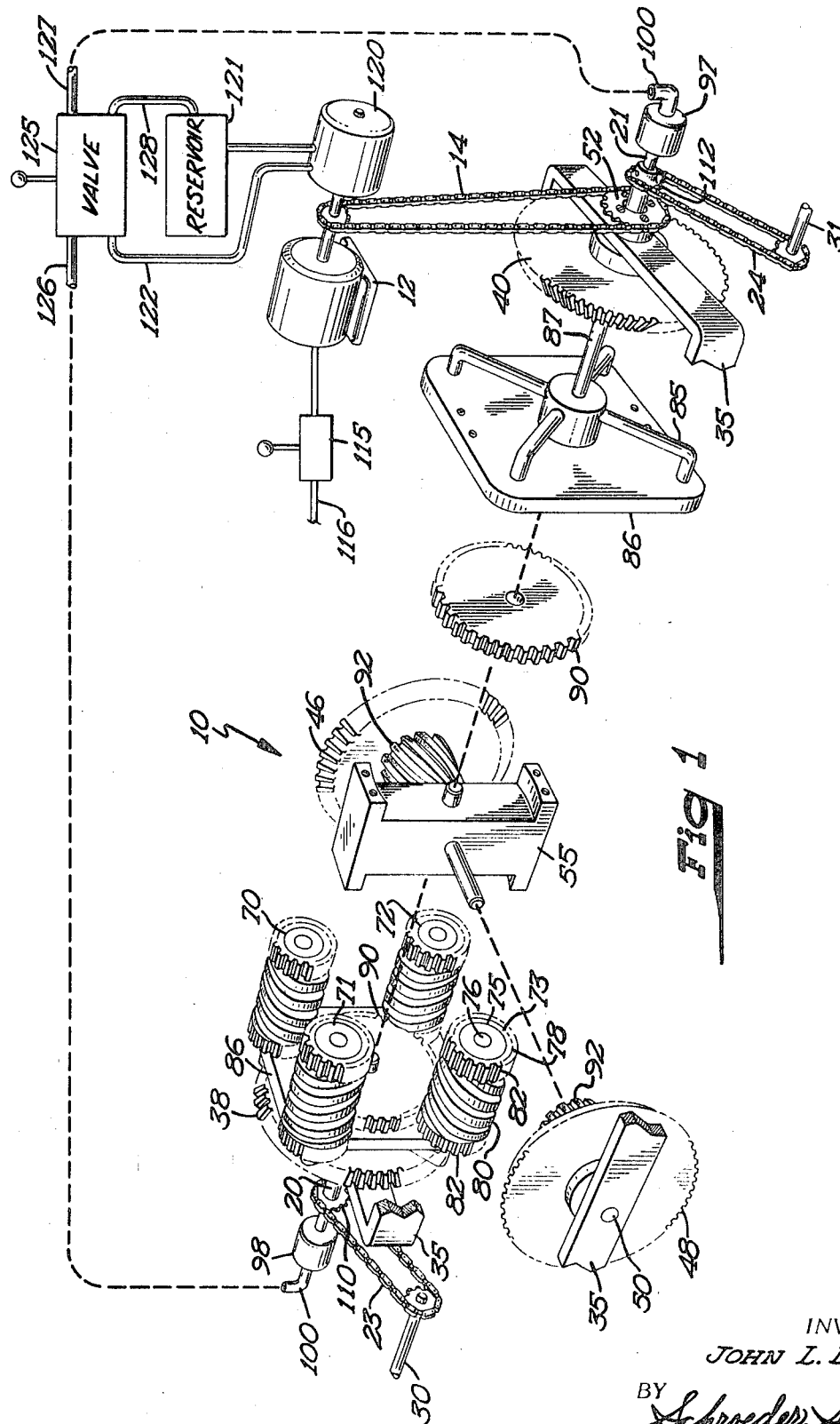

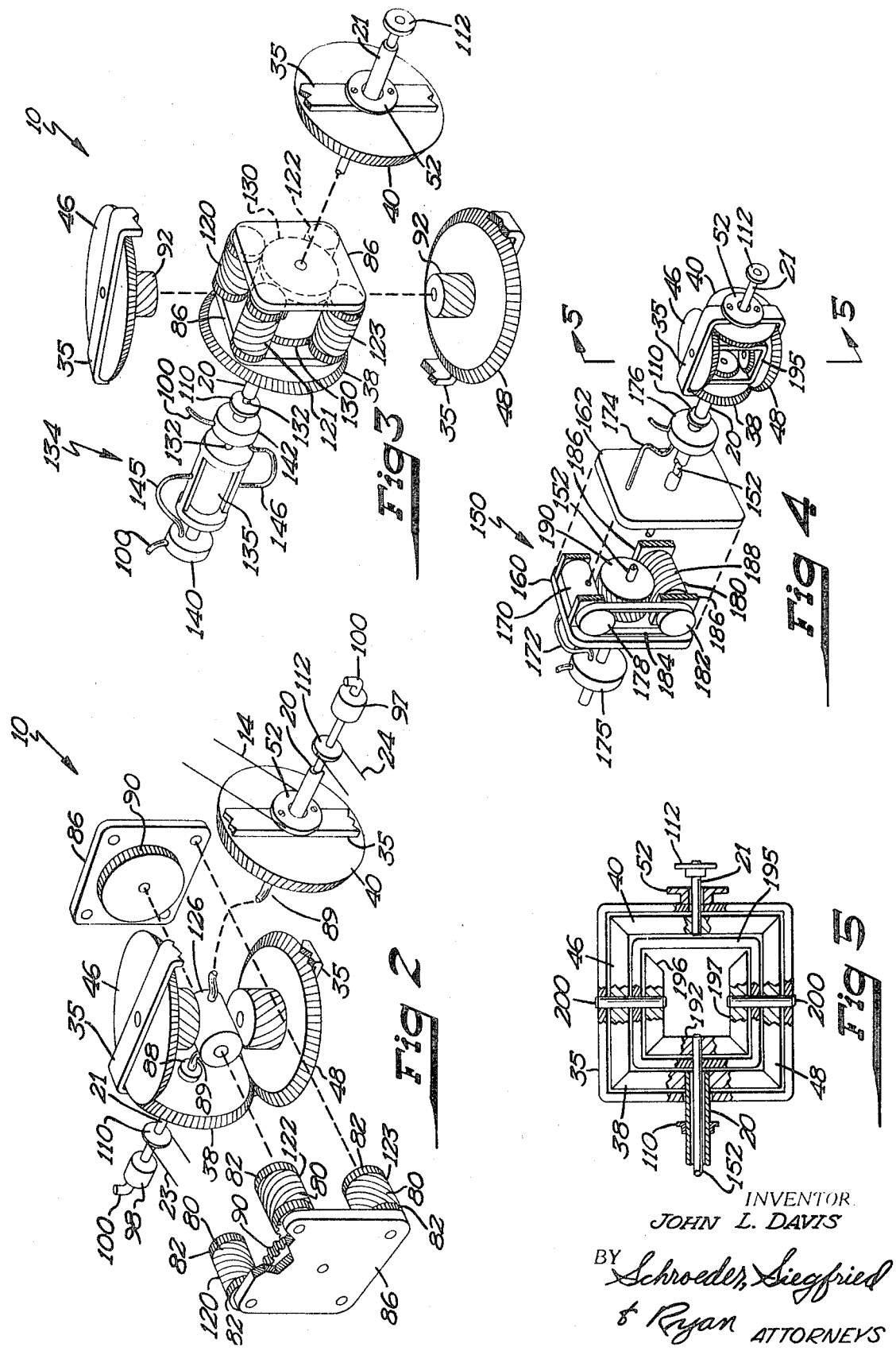

MOBILE DRIVE MECHANISM

My invention relates to a differential gearing mechanism and more particularly to an improved mobile drive and steering mechanism for vehicles which are steered by a difference in rotation imparted to drive shafts on each side of the vehicle.

Differential drive mechanisms for steering vehicles in this manner are broadly old. However, they have employed complicated gearing arrangements, plural drive motors and clutches. In the present invention, a simplified differential gear mechanism is provided which utilizes a conventional gear differential with a drive motor mounted therein to rotate with the differential frame and provide rotation to the idler gearing to permit the driven shafts to be rotated with a difference in rotation for a desired steering effect. The internal motors of the hydraulic type provide a compact easily controllable and improved drive and steering mechanism. Control of the same is effected merely by reversing direction of flow through the hydraulic motor and to proportionately control the rotation of the same.

It is therefore a principal object of this invention to provide an improved mobile drive and steering mechanism for vehicles.

Another object of this invention is to provide in a mobile drive and steering mechanism, an improved differential employing an internal control motor and gearing.

A further object of this invention is to provide a mobile drive and steering mechanism of this type utilizing a hydraulic motor for providing the control rotation thereto.

A still further object of this invention is to provide an improved mobile drive and steering mechanism which is simple in design and easy to control.

These and other objects of this invention will become apparent from the reading of the attached description together with the drawings wherein:

FIG. 1 is an exploded perspective view of my improved mobile drive and steering mechanism with parts broken away showing the preferred embodiment of the same, FIG. 2 is an exploded perspective view with parts broken away showing a second embodiment of the improved mobile drive and steering mechanism, FIG. 3 is an exploded perspective view with parts broken away showing an alternate embodiment of the improved mobile drive and steering mechanism, FIG. 4 is an exploded perspective view with parts broken away showing a still further embodiment of the differential gearing mechanism performing the improved mobile drive and steering mechanism, and FIG. 5 is a sectional view of a portion of the embodiment of FIG. 4 taken along the lines 5—5 therein.

My invention in the mobile drive and steering mechanism is shown in one embodiment in FIG. 1 as comprising generally a differential gear mechanism indicated generally at 10. The gear mechanism is shown in exploded view with parts broken away to show the arrangement of parts and it receives its motive power or drive from a power source indicated schematically at 12 driving through a drive chain 14 to the differential gear mechanism. Power is taken from the differential gear mechanism through output shafts 20, 21 coupled therewith which drive through chain drives 23, 24 to drive and steering shafts 30, 31 indicated schematically in FIG. 1. The differential gear mechanism includes a frame structure 35 which is generally rectangular in outline and mounts a pair of bevel drive gears 38 and 40 therein. These gears are connected to the output or power transmitting shafts 20, 21 which are journaled in the frame 35 and disposed at diametrically opposed ends of the same such that the power transmitting shafts are concentric. Frame 35 also mounts intermediate bevel gears 46, 48 which are journaled on the frame through stub shafts 50 with the opposite ends of the respective shafts being journaled in a mounting block 55 positioned centrally of the frame. The intermediate bevel gears or idler gears mesh with the drive gears 38, 40 to provide a conventional differential gearing arrangement. Attached to the frame 35 is an input gear 52 which is positioned concentric with the shafts 20, 21 and is coupled to the input chain 14 leading to the power source or motor 12 by means of which the entire frame of the differential gear mechanism may be rotated to provide input rotation and power thereto.

Positioned within the frame 35 are four control drive motors 70 – 73 of the hydraulic type. These are inside out motors in which the central portion is stationary and the outer cylindrical portion is rotatable. Thus the central portion of each motor 75 has an inlet 76 and an outlet (not shown) at the extremities of the same for the purpose of directing fluid flow into and out of the motor. The outer cylindrical part 78 is journaled on the stationary inner cylindrical part and includes a spiral gear surface 80 at the center thereof and conventional gearing 82 at the ends thereof. The motors are reversible, that is fluid flow directed therethrough in opposite directions will reverse the direction of rotation of the outer casing with respect to the stationary center part. Thus the motor is a combination of a motor and a gear surface with the spiral gear 80 positioned intermediate the conventional gears 82 at the extremities thereof which rotate relative to the stationary portion with the motor being supported by fluid lines 85 on either end of the same. The hydraulic lines are connected in common, being supported by a frame 86 at either extremities of the motors and are directed as a single line 87 through the power transmitting shafts 20, 21 which are hollow. The hollow shafts may serve as the fluid conduit for the fluid flow through to the motors and where this is utilized, a separate hydraulic rotary coupling (not shown) may be connected between the rotatable shaft and the stationary hydraulic lines within the frame. Where desired, a separate fluid line may be positioned within the separate or hydraulic drive shafts and journaled therein through suitable bearing means (not shown). Also journaled within the casing and on the centrally located mounting block 55 which journals one end of the shafts 50 and the bevel gears 46, 48 are synchronizing gears 90 which mesh with the straight gear portions 82 on the cases or exteriors of the control drive motors to synchronize operation of the same. The intermediate bevel gears have attached thereto spiral gear members 92 which are sloped or directed in opposite directions and these mesh with the spiral gear sections 80 on the respective control motors. Thus the spiral gearing associated with each spiral gears 92 of the intermediate bevel gears 46 or 48 will be sloped in the opposite direction to provide the same direction of rotation to the bevel gear and each of the bevel gears within the frame will be rotated in the opposite direction. At the end of each of the power transmitting shafts 20, 21 are positioned rotary couplings 97, 98 which permit rotation of the shafts and relative to stationary fluid connections 100 leading to and from an external fluid source. Where a separate hollow tubular shaft or conduit is provided, the hydraulic couplings will be omitted and journaling or bearings will be provided at this point to permit relative movement between the stationary fluid conduit lines and the rotary shafts 20, 21. The shafts 20, 21 are supported through suitable bearing means (not shown) connected to an external frame apart from the frame 35 of the differential gear mechanism to support the same. Mounted on the shafts 21, 22 are output sprockets 110, 112 by means of which the drive chain 23, 24 leading to the drive shafts 30, 31 of the vehicle may be coupled to receive the output motion from the differential gear mechanism.

As will be seen in FIG. 1, the control for the drive and steering of the vehicle is effected by means of a hand operated control 115 controlling the energization of the motor 12 from a source 116. The drive motor 12 which imparts the driving rotation to the differential gearing also is connected to a pump 120 to drive the same. The pump has associated therewith a fluid reservoir 121 supplying an inlet flow to the pump with the outlet, as indicated by the conduit 122, leading to a four-way control valve or reversing valve 125. The output conduits of the control valve as indicated at 126, 127 lead to the couplings or stationary tubing 100 at the ends of the differential gearing and the valve includes a return line 128 leading to the reservoir. The drive motor may be bi-directional and the pump will then operate for either direction of rotation to provide an output flow through the conduit 122 to the four-way valve which may reverse the direction of flow through the control motors to reverse the direction of rotation of the same. The speed of rotation of the motor 12 or a variation in orifice opening will vary the amount of fluid being pumped or the rate of fluid flow from the pump through the control valve to vary the speed of rotation of the control motors 70 – 73.

In the operation of the mobile drive and steering mechanism of FIG. 1, input rotation is provided to the frame or differential gear mechanism through the input gear 52 which is attached to the frame and driven from the power source 12 through the chain 14. It will be understood, however, that suitable gearing from the remote power source to a gear mounted on the frame may be substituted therefore. Input rotation of the differential gear frame will rotate the bevel gears 38, 40 and the intermediate gears 46, 48 along with the structure including the control motors 70 – 73 and the control gearing therefrom imparting to the output sprocket 110, 112 on the output shafts 20, 21 the same direction of rotation. This would be at a condition when no fluid flow would be directed through the rotary hydraulic couplings to the control motors 70 – 73 therein. With fluid flow in a predetermined direction through the rotary couplings and shafts 20, 21 to the intermediate hydraulic lines 85 and to the motors 70 – 73 supported thereon, rotation of the casings of the motors and the gears'surfaces 80, 82 thereon will cause rotation of the synchronizing gears to insure that all motors will be rotating in the proper direction and at the same speed. The rotation of the spiral portions 80 of the control drive motors will cooperate with the spiral gear surfaces 92 attached to the intermediate gears 46, 48 to rotate the same. These rotations will be in the opposite direction and will impart to the output shafts 20, 21 a rotation apart from the input rotation imparted to the entire differential gear mechanism or the frame carrying the same. Thus one shaft will move or rotate at a greater rate of rotation than the other since the rotations of the output shafts will be in the opposite direction. This will provide a steering as well as a drive to the shafts 30, 31 associated with the vehicle for turning and/or steering the same as the drive shafts 30, 31 impart the mobile drive power for the same. By reversing the direction of flow through the control motors 70 – 73 which all operate simultaneously and in the same direction, it is possible to reverse the direction of rotation of the output shafts 20, 21 from the previous condition increasing the relative rotation with respect to the drive shafts 30, 31 to slow down or speed up the respective rotations in either direction to permit turning movement and simultaneous drive movement for the vehicle in either direction as controlled by the rotation of the shafts 30, 31 connected to the tread mechanism of the vehicle. Fluid flow will be directed through the rotary hydraulic lines permitting stationary input and output connections to the differential gear mechanism and the entire control mechanism will be located within the interior of the bevel gear to provide a compact and solid arrangement. An external power source is required for driving the hydraulic source and this can be employed or included with the power drive mechanism as indicated in FIG. 1 through a suitable control valve 125 which is bi-directional to reverse the flow through the fluid flow lines and control the rate of flow therethrough.

The embodiment of the mobile drive and steering mechanism shown in FIG. 2 is similar to that shown in FIG. 1 and corresponding parts will be identified with the same numbering for simplicity. Thus the differential gear mechanism 10 of this embodiment includes the frame 35 having the power transmitting shaft 20, 21 journaled therein and attached to bevel drive gears 38, 40. The same would be powered through the input gear 52 attached to the frame from the power source (omitted for simplicity) coupled by means of the chain drive 14. Power would be transmitted from the shafts 20, 21 through the sprockets 110, 112 mounted thereon through the chains 23, 24 to the drive shafts (omitted for simplicity) of the vehicle. Intermediate gears 46, 48 are mounted in the frame and journaled thereon to mesh with the drive gears 38, 40. In this embodiment, the control drive motors 70 – 73 are replaced with drive gears 120 – 123 respectively which are journaled in the frame to rotate therein and mesh with the synchronizing gears 90 also journaled in the frame. The latter will be journaled on the shafts supporting control motor 126 which are hollow to provide the inlet and outlet flow therethrough. The control gears have the straight gear portions 82 and the spiral gear portion 80 intermediate the extent of the same and the control motor is connected to the synchronizing gears 90 to drive through the straight gear portions of the control gears 120 – 123 to rotate the same and through the spiral portions 82 thereon drive the spiral gear portions 92 of the intermediate bevel gears 46, 48. In this embodiment fluid flow through the control motor is directed through the hollow power transmitting shafts 20, 21 and through rotary couplings 88 within the frame coupling the supporting shafts and fluid lines 89 for the control motor to the frame and the drive shafts 20, 21. The rotary fluid couplings 97, 98 are present at the ends of the power transmitting shafts and the shafts are suitably journaled remote from the frame through supporting structures (not shown).

In the operation of this embodiment, input motion is imparted to the frame from the drive motor 12 and the input gear 52. Without fluid flow through the control motor, the entire assemblage of the differential gear mechanism will rotate driving the power shafts 20, 21 and the sprockets 110, 112 thereon. There will be no relative movement of the intermediate or drive bevel gears under this condition. Fluid flow through the control motor will rotate the synchronizing gears 90 which in turn will rotate the control gears 120 - 123 in the proper direction to impart a rotation to the intermediate bevel gears 46,48. This rotation will be in opposite directions with respect to the bevel gears such that proper mesh with the drive gears will take place and they will rotate in a manner to add to or subtract from the rotation imparted to the frame and consequently slow down or increase respectively the speeds of the power transmitting shafts 20, 21 journaled therein. In this embodiment a reversal of flow through the control motor 126 will rotate the control gears in the opposite direction having an opposite effect on the intermediate bevel gears and drive gears to again slow down or increase the speed of the respective power shafts. In this manner a reversal of rotation of the power transmitting shafts and hence the drive shafts coupled thereto or an increase or decrease in speed of the power shafts will take place for proper steering and driving.

The embodiment shown in FIG. 3 utilizes a control motor located outside the periphery of the frame of the differential mechanism and the drive and idler gears therein. As will be hereinafter identified, the control motor drives through a concentric shaft which is within and concentric with one of the power transmitting shafts associated with the driven gears to rotate gearing which cooperates with the spiral gears connected to the idler gears for driving the same. For simplicity, the details of a motor drive source and the control source together with the driven shafts or steering shafts of the vehicle are omitted. Similarly the journaling of the power transmitting shafts 20, 21 apart from the frame of the differential mechanism is also omitted. Where the parts of the differential gearing mechanism and its drive are the same as in the preceding embodiments, the same numbering will be employed for simplicity in disclosure. Thus the differential gear mechanism indicated generally at 10 employs the frame 35 which mounts the idler gears 46, 48 and journals the same therein on their stub shafts. The driven gears 38, 40 connected to the driven shafts 20, 21 respectively are journaled in the frame and cooperate with the idler gears in a conventional manner. The input drive to the differential gear mechanism is through the sprocket or gear mechanism 52 attached to the frame which is connected to the power source, as indicated in FIG. 1. The output or driven shafts 20, 21 mount the sprockets or pulley mechanisms 110, 112 leading through the chain drives to the steering shafts of the vehicle as indicated at 23, 24 and 30, 31 respectively in FIG. 1. These details are omitted for simplicity. Frame 35 also mounts between the supporting plates 86 a plurality of control gears 120 – 123, as in the embodiment in FIG. 2, with the synchronizing gears now being replaced by drive gears 130 connected to the concentric shaft 132 positioned through the hollow power transmitting shaft 20 and connected to the driven portion of a control motor 134. Thus rotation of the concentric shaft 132 which is directly connected to the driving gears 130 of the control operates to drive the control gears 120–123 by cooperating with the straight gear portions 82 thereon rotating the spiral portions 80 which cooperate with the spiral portions 92 connected to the idler gears 46, 48. In this embodiment the control motor is a rotary hydraulic motor carried by the power transmitting shaft 20 which control motor includes a cylindrical stationary portion 135 and inner rotary portion (not shown) connected to the concentric shaft 132. The stationary portion is directly connected to the power transmitting shaft 20 to rotate therewith and suitable hydraulic couplings 140, 142 permit the transmission of hydraulic fluid or motive fluid to the control motor through stationary lines 100 from the fluid source with the rotary portions including lead conduits 145, 146 leading to the stationary portion of the hydraulic motor to permit the introduction and return of hydraulic fluid therefrom. With no fluid flow through the control motor, the motor, which is indicated generally at 134, rotates with the power transmitting shaft 20 and no relative movement occurs between the inner concentric shaft 132 and the power transmitting shaft 20. Fluid flow through the control lines from the power source, as indicated in FIG. 1, will cause the motor 134 to rotate driving the inner concentric shaft 132 relative to the power transmitting shaft 20 to rotate the driven gears 130 and hence the control gears 120 – 123 to rotate the spiral gear portions 92 of the idler gears 46, 48 in opposite directions. A reversal in flow of the control fluid through the control motor 134 will reverse the operation of the same with a direction rotation of the inner concentric shaft to reverse the direction of rotation of the idler gears 46, 48 coupled thereto through the control gearing within the differential frame to add to or subtract from the ultimate rotation of the driven gears 38 to 40 as in the beforementioned embodiments.

Thus in the operation of this embodiment, rotation of the differential gear mechanism with a frame through the input rotation to the input gear or pulley 52 will rotate the differential mechanism with no relative rotation of the driven gears 38, 40 and the idler gears 46, 48 therein. Thus both power shafts 20, 21 will be driven in the same direction and movement thereof will be transmitted through the drive sprockets 110, 112 to the steering and drive shafts 30, 31 of the vehicle. With the introduction of control fluid into the control motor 134 which is rotating with the driven shaft 20, a rotation of the concentric shaft 132 will take place causing the gears 130 and 120 – 123 to rotate and imparting a rotation through the spiral portions 92 of the idler gears 46, 48 to rotate the driven gears 38, 40 of the differential mechanism. This rotation, depending upon the direction of the same, will add to or subtract from the rotation imparted to the differential gear mechanism and the power transmitting shafts 20, 21 to provide a difference in rotation between the drive sprockets 110, 112 on the power transmitting shafts to cause a turning movement to the vehicle. A reversal in the direction of fluid flow through the control motor 134 will operate to reverse the direction of rotation of the driven gears 38, 40 by virtue of the reversal and rotation of the idler gears 46, 48 to vary the difference in rotation between the power transmitting shafts 20, 21 and hence the sprockets mounted thereon to the control and drive shafts 30, 31 of the vehicle.

The embodiments shown in FIGS. 4 and 5 also utilize a remotely positioned control motor in the manner similar to FIG. 3 and with a direct drive to the idler gears 46, 48 of the differential gear mechanism. As in the before-mentioned embodiments, the details of the power driving source and the control source together with the driven shafts 30, 31 of the vehicle are omitted for simplicity. Similarly where parts employed in the differential gear mechanism are identical with the previous embodiments, the same numbering is employed. Thus in FIGS. 4 and 5, the differential gear mechanism 10 employs the mounting frame 35 which journals the power transmitting shafts 20, 21 carrying the driven gears 38, 40 of the differential mechanism. The idler gears 46, 48 are journaled in the frame and mesh with the driven gears 38, 40 in a conventional manner. Input to the differential mechanism is through the drive sprocket or gear 52 attached to the frame from the remote rotating power source.

In this embodiment, the control motor, indicated generally at 150, drives a concentric shaft 152 positioned through the hollow power transmitting shaft 20 which mounts the output sprocket 110 of the differential gear mechanism. Control motor 150 is mounted in a frame comprised of the frame parts 160, 162 which are connected to and carried by the output shaft 20. The actual control motor is a rotary hydraulic motor, indicated at 170, which receives fluid input through control lines 172, 174 leading from rotary hydraulic couplings 175, 176 mounted on the power transmitting shaft 20. The rotary hydraulic control motor 170 has an output pulley 178 which is coupled to a control gear 180 having a pulley 182 at the extremity of the same by means of which rotation is imparted thereto through a belt type drive 184. The control gear is journaled in flange portions 186 attached to the frame part 160, 162 and the control gear includes a spiral portion 188 which cooperates with a spiral gear 190 journaled between the frame parts 160, 162 by the concentric drive shaft 152. The latter is directed through the hollow power transmitting shaft 20 and the rotary hydraulic coupling 176 to the differential gear mechanism 10 in a conventional manner. Within the differential gear mechanism 10, as will be seen in the sectional view of FIG. 5, the power transmitting shaft 152 mounts a bevel gear 192 journaled in a frame part 195. Cooperating with the bevel gear 192 are bevel gears 196, 197 connected respectively to the drive shafts or journaling shafts 200 of the idler gears 46, 48. Thus in this embodiment, the spiral gear portions 92 connected to the idler gears 46, 48 are omitted and a direct drive from the bevel gears 196, 197 is provided, the bevel gears being driven by the bevel gear 192 attached to the concentric shaft and rotating with the rotation of the control motor 170. By reversing the direction of rotation of the control motor, the direction of rotation of the bevel gears 196, 197 are reversed and hence the rotation of the idler gears 46, 48 are reversed.

In this embodiment, as in the embodiment of FIG. 3, the control motor and its mounting frame rotate with the power transmitting shaft 20 and control fluid is directed thereto through the stationary hydraulic coupling portions 175, 176 from the control valve as indicated in FIG. 1. Thus with no rotation of the control motor due to an absence of fluid flow therethrough, the control motor mounting assembly 150 and the power transmitting shafts 20, 21 rotate in the same direction with input rotation to the differential gear mechanism through the input gear or sprocket 52 being driven from the power source. By introducing a control fluid to the control motor, rotation of the same in one direction or the other will take place, depending upon the direction of flow therethrough, causing rotation of the control gear 180 and spiral gear 190 connected to the control shaft 152 to rotate the small differential gear mechanism located in the mounting frame 195 which will cause rotation of the idler gears 46, 48 to impart a rotation to the driven gears 38, 40 in a predetermined direction. The latter will add to or subtract from the rotation imparted to the differential gear case or frame from the input mechanism to vary the rotation between the output shafts 20, 21 and hence the control and drive shafts 30, 31 of the vehicle connected to the differential gear mechanism through the drive sprockets 110, 112 mounted on the power transmitting shafts 20, 21 respectively. By varying the direction of rotation and the speed of rotation of the control motor, the amount of rotation introduced to the driven gears 38, 40 is varied or reversed to vary the ultimate rotation of the power transmitting shafts 20, 21 of the differential gear mechanism with respect to the input rotation imparted to the differential gear mechanism. The latter will vary the rotation or control imparted to the drive and steering shafts 30, 31 of the vehicle or with that structure connected to the drive sprockets 110, 112 of the power transmitting shafts.

Thus in the embodiments of FIGS. 3, 4 and 5, location of the control motor is outside of the differential gear frame and its rotation is directed into the differential gear frame through a concentric shaft located within one of the power transmitting shafts to impart a rotation to the idler gears and causing the driven gears to rotate apart from the rotation of the differential gear frame.

It will be recognized that in the before-mentioned embodiments, modifications in the shape and arrangement of parts may be made without departing from the scope of the invention. Therefore I wish to be limited only by my appended claims.

What is claimed is:

1. A mobile drive and steering mechanism for vehicles which are steered by a difference in rotation imparted to drive shafts to each side of the vehicle comprising, a differential including a frame having a first and second bevel gear therein and connected to first and second power transmitting shafts in axial alignment and extending through the frame and journaled therein, intermediate bevel gears journaled on the frame about an axis normal to the axis of the shafts and the first and second gears and meshing therewith, power input means connected to the frame of the differential to provide a rotational input thereto, means within the differential frame and coupled to the intermediate bevel gears to provide a rotation of the bevel gears in opposite directions about the axis of the first and second shafts and in varying speeds, rotary motor means coupled to the means within the differential and rotatable with the frame from driving the intermediate bevel gears, and means on the first and second power transmission shafts for transmitting rotation therefrom to the power transmitting shafts of the vehicle.

2. The mobile drive and steering mechanism of claim 1 in which the rotary motor means is positioned within the frame.

3. The mobile drive and steering mechanism of claim 1 in which the rotary motor means is positioned outside of the frame and coupled thereto through a concentric shaft positioned through one of the power transmitting shafts.

4. The mobile drive and steering mechanism of claim 1 in which the rotary motor means is a reversible hydraulic motor and in which the power transmitting shafts are hollow to transmit fluid to and from the motor being coupled thereto.

5. A mobile drive and steering mechanism of claim 4 and including rotary fluid couplings positioned on the ends of the power transmitting shafts to connect fluid lines thereto.

6. The mobile drive and steering mechanism of claim 1 in which the input means is a rotary power transmission means connected to the frame of the differential.

7. The mobile drive and steering mechanism of claim 1 in which the means within the frame of the differential gearing and coupled to the intermediate bevel gears is a gear means mounted on separate supporting shafts in the frame and connected to the intermediate bevel gears on the frame to rotate the same about the axis of movement thereof.

8. A variable speed control for a pair of power driven shafts comprising, bevel gears connected to each of said power driven shafts and journaled in a frame, said pair of gears cooperatively and rotatably engaging a gear means mounted in the frame to form a differential gear mechanism, control motor means mounted to rotate with said differential gear mechanism when said shafts are rotating in the same direction and at the same velocity, a primary motor means connected to the differential gear mechanism for supplying power to rotate said shafts, and control gear means coupled with said control motor means and engaging the gear means of the differential for varying the relative rotation of the shafts.

9. The variable speed control of claim 8 in which the control motor means is mounted within the differential gear mechanism.

10. The variable speed control of claim 8 in which the control motor means is mounted on one of said power driven shafts and rotatable therewith.

11. The variable speed control of claim 8 in which said control motor means is hydraulic and including means for supplying motive fluid to said hydraulic control motor.

12. The variable speed control of claim 10 in which the means for supplying motive fluid to the hydraulic control motor includes passageways in the power driven shafts and fluid conduits connected to the hydraulic motor therefrom.

13. The variable speed control of claim 11 and including rotatable hydraulic couplings connected to the power driven shafts to provide a passage to the hydraulic fluid conduits therethrough from stationary hydraulic supply lines.

14. The variable speed control of claim 8 in which the primary motor means is coupled to the frame of the differential gear mechanism through a rotary motion imparting coupling connected to the frame.

15. The mobile driving and steering mechanism of claim 14 and in which at least one of the power transmitting shafts is tubular and including rotary hydraulic couplings associated with said shaft to provide for flow of hydraulic fluid to and from said motive means.

16. The mobile drive and steering mechanism of claim 15 in which the motive means is a plurality of motors with fluid coupling lines connected thereto through passages in the first and second power transmitting shafts and including a plurality of synchronizing gears coupling the motive means to the control gear on the intermediate gear means.

17. A mobile drive and steering mechanism for vehicles which are steered by a difference in rotation imparted to drive shafts to each side of the vehicle comprising, a differential including a frame having a first and second bevel gear therein and connected to first and second power transmitting shafts in axial alignment and extending through the frame and journaled therein, intermediate gear means journaled on the frame about an axis normal to the axis of the shafts and the first and second gears and meshing therewith, rotary power transmission means connected to the frame of the differential and adapted to be connected to a motive source to provide a rotational input to the differential frame about the axis of the first and second power transmitting shafts, control gear means journaled on the differential frame and coupled to the intermediate gear means to impart a rotation thereto causing movement of the first and second bevel gears in an opposite direction reversible rotative motive means coupled to the control gear means and rotatable with the differential frame when the first and second power transmitting shafts are rotating in the same direction to drive the control gear means, and means on the first and second power transmitting shafts adapted to couple rotation thereof with the drive shaft of the vehicle.

18. The mobile drive and steering mechanism of claim 17 in which the hydraulic motive means is mounted in the differential frame and coupled to the control gear therein.

19. The mobile drive and steering mechanism of claim 17 in which the hydraulic motor is mounted remote from the differential frame and is coupled to the control gear through a concentric shaft positioned through one of the power transmitting shafts.

* * * * *